Jan. 23, 1923.
O. W. STEINDORF,
FLANGED PIPE COUPLING.
FILED JULY 7, 1922.
1,443,051
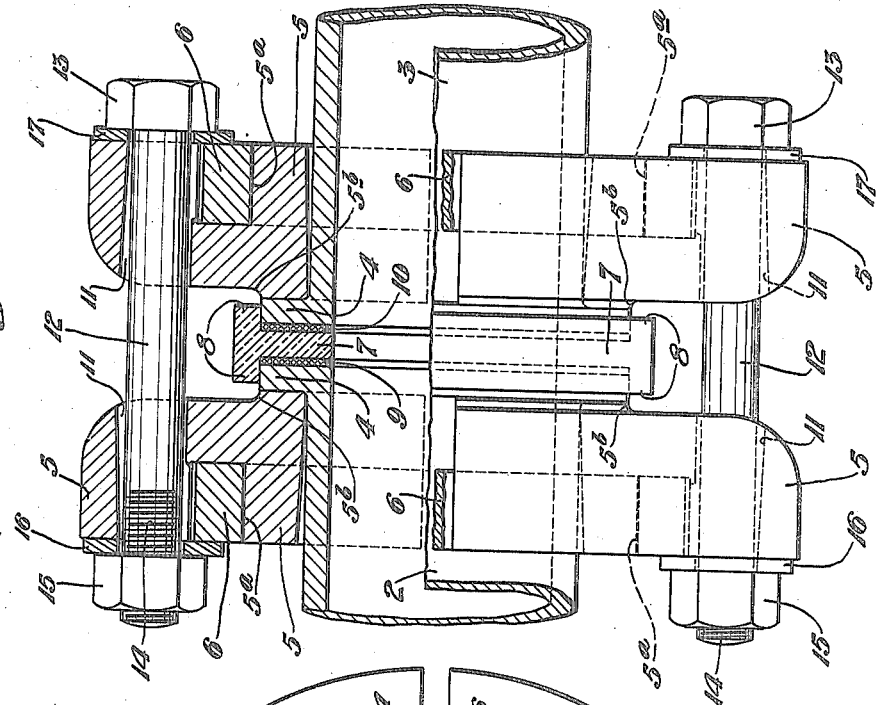
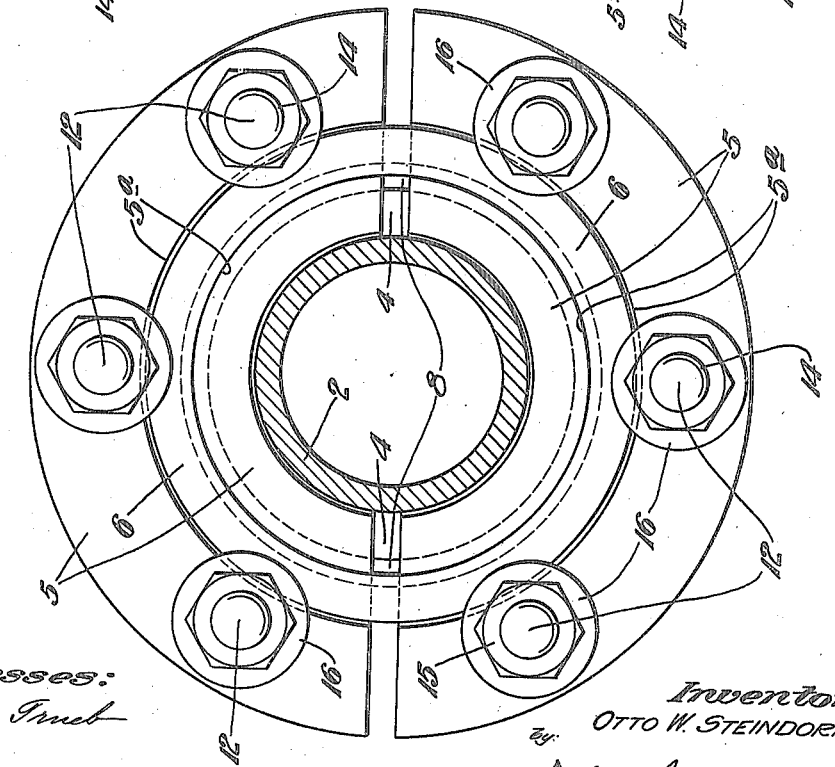
Witnesses:
Edwin Trueb
Inventor:
OTTO W. STEINDORF,
by D. Anthony Usina
his Attorney.

Patented Jan. 23, 1923.

1,443,051

UNITED STATES PATENT OFFICE.

OTTO W. STEINDORF, OF WHEELING, WEST VIRGINIA.

FLANGED PIPE COUPLING.

Application filed July 7, 1922. Serial No. 573,482.

*To all whom it may concern:*

Be it known that I, OTTO W. STEINDORF, a citizen of the United States, and resident of Wheeling, in the county of Ohio and State of West Virginia, have invented certain new and useful Improvements in Flanged Pipe Couplings, of which the following is a specification.

This invention relates to pipe couplings and particularly to couplings for flanged pipes, and has for one of its objects the provision of a joint of this type that is composed of a plurality of parts all of which are adapted to be assembled on the pipes after both ends have been flanged.

Another object is to provide the joint with a novel form of gasket ring adapted to form a tight joint and to provide a joint to hold the connecting ends of the pipe diametrically even.

A further object is to provide a pipe joint having the novel construction, design, and combination of parts described in the following specification and illustrated in the accompanying drawings.

In the drawings, Figure 1 is an end elevation of a pipe joint constructed in accordance with this invention.

Figure 2 is a side elevation of the joint of Figure 1 partly in section.

Referring more particularly to the drawing, the numerals 2 and 3 designate the pipes to be coupled, each of which have ends upset to form shoulder flanges 4. Sectional coupling rings 5 are mounted on each of the pipes and adapted to abut the shoulder flanges 4.

The sectional coupling rings 5 have their rear or outside faces channeled or grooved as at 5ª to receive retaining rings 6 which have an internal diameter of a size to fit over the shoulder flanges so as to provide for mounting said rings on the pipes after they are flanged. The bore of the sectional coupling rings 5 is flared or inclined outwardly on a slight angle to provide for a slight tilting of the rings when applying the retaining rings 6 in the grooves 5ª.

A gasket ring 7, which is substantially T-shaped in cross section, is mounted between the ends of the pipes and has its flanges 8 overlying the edges of the shoulder flanges 4. Suitable non-metallic washers 9 and 10 are arranged between the ends of the pipe and the gasket ring 7 to provide a fluid tight joint and to permit expansion and contraction. The gasket ring 7 itself serves to form a tight joint and to provide a joint adapted to keep the ends of the pipes diametrically even.

The forward or inside faces of the sectional coupling rings 5 are cut away to form shoulders 5ᵇ on a level with the pipe shoulder flanges 4, thus forming sufficient clearance between the flanges 8 of gasket ring 7 and the coupling rings 5, so that a maximum bearing might be had by the flanges 8 of the gasket ring 7 on the pipe flanges 4 without coming in contact with the coupling rings 5.

The sectional coupling rings 5 are provided with a plurality of apertures 11 through which the bolts 12 are adapted to pass. The bolts 12 have heads 13 and are provided with the usual threaded end 14 for the reception of nuts 15. The apertures 11 are formed as close to the channels or grooves 5ª as practical, so that the heads 13 and nuts 15 of the bolts 12 will overlie the retaining rings 6 and thus lock them in position. In order to more securely lock the retaining rings 6 in position, I provide the washers 16 and 17 under the heads 13 and nuts 15, respectively, of the bolts, thus providing a greater bearing surface against the rings 6. It will be understood, however, that the washers 16 and 17 may be omitted if desired.

It will be readily seen that a joint constructed in accordance with this invention may be readily assembled, and taken apart, due to its few parts and simple design. It will also be seen that the several parts of the joint may be assembled on the pipes after they are flanged, that the abutting ends of the pipes may be turned in either direction without it being necessary to match holes in the couplings, and that no special tools nor skilled workmen are necessary to apply the joint.

While I have shown and described only one specific embodiment of my invention, it will be understood that I do not wish to be limited thereto, since various modifications may be made without departing from the spirit of my invention as defined in the appended claims.

I claim:—

1. In a coupling, the combination with members to be coupled having annular shoulder flanges formed integral therewith, of a sectional ring mounted on each of said members and abutting said shoulder flanges, integral retaining rings mounted in grooves in said sectional rings for maintaining them in position on said members, and bolts mounted in suitable apertures in said sectional rings and provided with suitable nuts, said bolts being adapted to draw said members together to form a tight joint when said nuts are screwed home, and the heads of said bolts and said nuts being adapted to overlie said retaining rings so as to lock them in position when said bolts and nuts are tightened.

2. In a coupling, the combination with members to be coupled having annular shoulder flanges formed integral therewith, of a sectional ring mounted on each of said members and abutting said shoulder flanges, integral retaining rings mounted in grooves in said sectional rings for maintaining them in position on said members, and means mounted in said sectional rings and overlying said retaining rings for holding said retaining rings in position and for drawing said joint together.

3. In a pipe coupling, the combination with two pipes to be coupled having annular shoulder flanges formed integral therewith, of a gasket ring mounted between the abutting end faces of said pipes, a sectional ring mounted on each of said pipes and abutting said shoulder flanges, integral retaining rings mounted in grooves in said sectional rings for maintaining them in position on said pipes, and means mounted in said sectional rings for holding said retaining rings in position and for drawing said sectional rings and said pipes together to form a tight joint.

4. In a pipe coupling, the combination with two pipes to be coupled having annular shoulder flanges formed integral therewith, of a gasket ring mounted between the abutting end faces of said pipes, a sectional ring mounted on each of said pipes and abutting said shoulder flanges, integral retaining rings mounted in grooves in said sectional rings for maintaining them in position on said pipes, and means mounted in said sectional rings and overlying said retaining rings for holding said retaining rings in position and for drawing said joint together.

5. In a pipe coupling, the combination with two pipes to be coupled having annular shoulder flanges formed integral therewith, of a gasket ring mounted between the abutting end faces of said pipes, and provided with flanges overlying the edges of said annular shoulder flanges on said pipes, a sectional ring mounted on each of said pipes and abutting said shoulder flanges, integral retaining rings mounted in grooves in said sectional rings for maintaining them in position on said pipes, and headed bolts mounted in suitable apertures in said sectional rings and provided with suitable nuts, said bolts being adapted to draw said rings and said pipes together to form a tight joint when said nuts are screwed home, and the heads of said bolts and said nuts being adapted to overlie said retaining rings so as to lock them in position when said bolts and nuts are tightened.

In testimony whereof, I have hereunto set my hand.

OTTO W. STEINDORF.